United States Patent [19]

Gardner

[11] 4,404,319

[45] Sep. 13, 1983

[54] THERMOSETTING MOLDING COMPOSITIONS

[75] Inventor: Hugh C. Gardner, Somerville, N.J.

[73] Assignee: Union Carbide Corporation, Danbury, Conn.

[21] Appl. No.: 279,438

[22] Filed: Jul. 1, 1981

[51] Int. Cl.$^3$ .......................................... C08F 218/14
[52] U.S. Cl. .................................. 525/39; 526/271; 526/272
[58] Field of Search .................. 526/271, 272; 525/39

[56] References Cited

U.S. PATENT DOCUMENTS

| | | | |
|---|---|---|---|
| 3,392,155 | 7/1968 | Muskat | 526/272 |
| 4,229,559 | 10/1980 | Cotter et al. | 526/271 |
| 4,313,859 | 2/1982 | Gardner | 526/271 |
| 4,316,835 | 2/1982 | Gardner | 526/271 |

*Primary Examiner*—Harry Wong, Jr.
*Attorney, Agent, or Firm*—Donald M. Papuga

[57] ABSTRACT

Curable liquid compositions are described which comprise a thermosetting resin with an acid number of about 40 or greater and an initiator selected from peroxyketals, ketone peroxides, and alkyl hydroperoxides.

19 Claims, No Drawings

THERMOSETTING MOLDING COMPOSITIONS

This invention is directed to polymerizable compositions which are suitable for producing fiber reinforced articles, such as automotive parts or appliance housings on fast mold cycles.

U.S. Pat. No. 4,263,413 issued Apr. 21, 1981 describes a homogeneous liquid mixture of (a) a particular half ester of an organic polyol, (b) maleic anhydride, (c) an ethylenically unsaturated monomer which forms a liquid homogeneous mixture with and is copolymerizable with the half ester and maleic anhydride, and (d) a basic compound.

U.S. Pat. No. 4,316,835 titled "Polyester Resin Compositions" describes a curable liquid mixture comprising (a) a polyester of the following formula:

(II)

wherein n has an average value between about 1.5 and about 2, m is 2−n, R' is the hydroxyl-free residue of a predominantly hydroxyl-terminated polyester obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, the ethylene oxide and propylene oxide derivatives of 2,2-bis-(4-hydroxyphenyl)-propane, and mixtures thereof, and mixtures of ethylene glycol and said diols, with a dicarboxylic acid or anhydride selected from the class consisting of maleic acid and anhydride, fumaric acid, ortho-phthalic acid and anhydride, isophthalic acid, terephthalic acid, carbic acid and anhydride, and mixtures thereof, (b) maleic anhydride and (c) an ethylenically unsaturated monomer which forms a homogeneous mixture with and is copolymerizable with (a) and (b), and wherein the molar ratio of polymerizable double bonds in (c) as compared to those in (a) plus (b) is between about 1 and about 3.6.

U.S. Pat. No. 4,293,686 titled "A Thermosetting Polyester Resin Composition" describes a polymerizable composition of (a) an unsaturated polyester, (b) a particular half ester of an organic polyol, (c) maleic anhydride and (d) an ethylenically unsaturated monomer.

The compositions of said applications are described as being cured by free radical mechanisms. Azo and peroxide curing agents are broadly described.

The resins in said applications are suitable for producing rigid fiber reinforced molded articles preferably by a process as described in U.S. patent application Ser. No. 135,906 filed on Apr. 14, 1980 in the name of R. Angell, Jr. and entitled "Molding Process and Apparatus Therefore".

A key feature of the process of Ser. No. 135,906 is the ability to produce a molded article in a short molding cycle, i.e., in about 5 minutes or less. Consequently said process is suitable in applications which require high productivity. A major objective in said process is to reduce the time required to cure the resin in the mold without sacrificing mechanical properties in the molded article.

In the typical embodiment of the compositions described in Ser. No. 135,906, an azo or peroxide initiator is present in the resin. When the resin formulation is injected into a mold, the heat from the mold decomposes the initiator forming free radicals which initiate the curing of the resin.

The speed at which the formulation cures depends on the thermal stability of the initiator. Initiators with low thermal stabilities generally cure the resin more rapidly than those with higher thermal stabilities. Typically, the thermal stability of an initiator is determined by measuring its rate of decomposition in a non-polar solvent, such as benzene or chlorobenzene, at a fixed temperature. Initiators are often characterized in terms of their 10 hour half life temperatures, i.e. the temperature at which one half of the initial concentration of initiator is depleted in 10 hours.

As an example of how the 10 hour half life temperature of the initiator affects the cure speed of a resin formulation, the data in Table 1 show the effect of initiator type on total cure time in the SPI gel time test. The resin in these tests consisted of a mixture of 50 percent by weight of the dimethacrylate of the 2-mole ethoxylate of bisphenol A, 50 percent of styrene, and about 200 parts per million of the monomethyl ether of hydroquinone as inhibitor. Each formulation contained 1 part by weight of initiator per 100 parts of resin (i.e. 1 phr).

The total time for the resin to cure in the presence of the t-butyl peroctoate initiator was 14 minutes. In the presence of the same amount of 1,1-bis(t-butylperoxy)-3,3,5-trimethylcyclohexane and t-butyl perbenzoate initiators, the times to cure were longer. These results, which reflected the higher 10 hour half life temperatures of these initiators, are shown in Table I:

TABLE I

| Initiator | 10 hr. Half Life Temp. In Non-Polar Solvent (°C.) | Total Time[1] (min) |
|---|---|---|
| t-butyl peroctoate | 73 | 14 |
| 1,1-bis(t-butylperoxy)-3,3,5-trimethyl cyclohexane | 92 | 63 |
| t-butyl perbenzoate | 105 | 120 |

[1]As determined by the SPI gel time test at 82° C.

In contrast, with the resin compositions of this invention containing components (a), (b), and (c), and having an acid number greater than about 40, a different trend in cure times is noted with certain classes of initiators. For example, with a resin composition containing 50 percent by weight of the half ester of formula (I) derived from a mixture of 2,2,4-trimethyl-1,3-pentanediol and propylene glycol, 50 percent of styrene, and 250 parts per million of methyl hydroquinone, unexpectedly fast cure times were observed using 1 phr of 1,1-bis(t-butylperoxy)-3,3,5-trimethyl cyclohexane as compared with t-butyl peroctoate and t-butyl perbenzoate. This is shown in Table II.

TABLE II

| Initiator | 10 hr. Half Life Temp. In Non-Polar Solvent (°C.) | Total Time[1] (min) |
|---|---|---|
| t-butyl peroctoate | 73 | 7.0 |
| 1,1-bis(t-butylperoxy)-3,3,5-trimethyl cyclohexane | 92 | 1.5 |
| t-butyl perbenzoate | 105 | 45 |

[1]As determined by the SPI gel time test at 82° C.

In addition to faster cure times, the compositions of this invention afford fiber-reinforced composites with excellent mechanical properties when molded under rapid molding conditions.

THE INVENTION

The curable liquid compositions of this invention comprise:

(a) an unsaturated ester characterized by the following empirical formula:

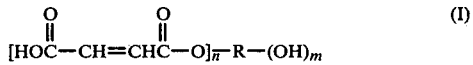

wherein n is a number having an average value of about 1.5 to less than about 4, m is equal to the free valence of R less the average value of n, R is the hydroxyl-free residue of an organic polyol or polyester which contained from 2 to 4, inclusive, hydroxyl groups, OH, in formula (I), (b) maleic anhydride, (c) an ethylenically unsaturated monomer, (d) an initiator selected from peroxyketals, ketone peroxides, and alkyl hydroperoxides. The composition may optionally contain an unsaturated polyester or a polyacrylate.

With respect to the composition of this invention, the unsaturated ester is characterized by the following empirical formula:

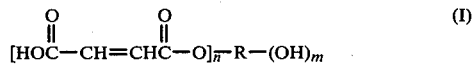

This ester is formed by the reaction of maleic anhydride and an organic polyol or hydroxyl-terminated polyester. The reaction product contains at least 1.5 ester groups. If the polyol or polyester contains 4 hydroxyl groups, the reaction product can have a value of n up to about 4. If the value of n is less than the number of hydroxyl groups available from the polyol or polyester, the reaction product will contain residual hydroxyl groups.

A basic compound may be used in the preparation of the ester. The basic compound is selected from an amine or a metal salt of an alcohol or carboxylic acid, or a metal oxide or hydroxide. A preferred basic compound is a secondary or tertiary amine. These amines have a $pK_b$'s in the range of 3 to 12. These basic compounds are described in U.S. Pat. No. 4,229,559.

If R in formula (I) is derived from an organic polyol, the latter contains at least two carbon atoms and may contain from 2 to 4, inclusive, hydroxyl groups. These polyols include alkane diols, triols, tetraols, aliphatic ether containing diols, triols, tetraols, cycloaliphatic containing diols, triols, and tetraols, aromatic containing diols, triols, and tetraols, and the like. Specific illustrations of organic polyols suitable in the practice of this invention are the following: ethylene glycol, diethylene glycol, 2,2,4-trimethyl-1,3-pentanediol, dipropylene glycol, 1,2-propylene glycol, polypropylene glycol having an average molecular weight of from about 150 to about 600, triethylene glycol, 1,4-cyclohexane dimethanol, neopentyl glycol, 2,2-dimethyl-3-hydroxypropyl 2,2-dimethyl-3-hydroxypropionate, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylol propane, 1,4-butanediol, 1,6-hexanediol, the polycaprolactone ester of trimethylol propane in which about 1.5 moles of caprolactone are reacted with each mole of trimethylol propane, the polycaprolactone ester of trimethylol propane in which about 3.6 moles of caprolactone are reacted with each mole of trimethylol propane, 2-ethyl-1,3-hexanediol, 1,5-pentanediol, tripropylene glycol, 2,2-bis(4-hydroxycyclohexyl)propane, 1,2,6-hexanetriol, 1,3-propanediol, and the like. Low molecular weight copolymers of styrene and allyl alcohol, similar to RJ-101 supplied by Monsanto Company, St. Louis, Mo., are also suitable. The use of mixtures of the aforementioned polyols in producing the ester of formula (I) which is soluble in an ethylenically unsaturated monomer, such as styrene, is very desirable.

If R in formula (I) is derived from a predominantly hydroxyl-terminated polyester, the latter has a molecular weight not exceeding 1500 and is obtained by the condensation of a diol with an dicarboxylic acid or anhydride, or mixtures of diols and diacids. The polyester is typically prepared at temperatures of about 200° C. from diols such as 1,2-propylene glycol, ethylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, 1,4-cyclohexane dimethanol, the ethylene and propylene oxide adducts of 2,2-bis(4-hydroxypropyl)propane, and mixtures thereof, and dicarboxylic acids or anhydrides, such as maleic acid and anhydride, orthophthalic acid and anhydride, isophthalic acid, terephthalic acid, fumaric acid, carbic acid and anhydride, and mixtures thereof. A molar excess of diol is used to obtain a predominantly hydroxyl-terminated product.

Carbic acid is bicyclo [2.2.1] hept-5-ene-2,3-dicarboxylic acid and carbic anhydride is bicyclo [2.2.1] hept-5-ene-2,3-dicarboxylic acid anhydride.

Modifying amounts of trifunctional acids, such as trimellitic acid; linear saturated diacids, such as adipic acid; or triols, such as trimethylol propane may also be used.

The unsaturated ester or formula (I) is produced in a reversible reaction. Consequently only a portion of the maleic anhydride used to react with the organic polyol or hydroxyl-terminated polyester forms half ester groups, the remainder being present in the resin.

The ethylenically unsaturated monomer which may be used is in the compositions of this invention is one which forms a liquid homogeneous mixture with maleic anhydride and the ester structure depicted by formula (I), supra. In addition, the ethylenically unsaturated monomer is copolymerizable with both maleic anhydride and the half ester.

Suitable ethylenically unsaturated monomers which may be employed in the practice of this invention are one or more monomers which contain a —CH=C< group, and preferably, a CH$_2$=C< group. These monomers include styrene and its derivatives and homologues, acrylic acid or methacrylic acid and their derivatives, such as their esters, amides or nitriles, e.g., methyl acrylate, methyl methacrylate, n-butyl methacrylate, acrylamide, methacrylamide, acrylonitrile, methacrylonitrile, and the like. Other suitable derivatives of acrylic or methacrylic acid include the esters formed by addition of these acids across ethylenically unsaturated double bonds, such as dicyclopentenyl acrylate, or norbornyl methacrylate. Also, the monomers include vinyl ethers and esters, e.g., vinyl acetate, vinyl propionate, methyl vinyl ether, and the like. Mixtures of the aforementioned monomers may be effectively employed in the practice of this invention.

The most preferred ethylenically unsaturated monomer contemplated in the practice of this invention is styrene since it has the most significant commercial utilization for such purposes. To determine whether or not a given ethylenically unsaturated monomer forms a liquid homogeneous mixture with maleic anhydride and the ester, it is combined with maleic anhydride and the ester at a temperature of from about 20° to about 70° C., utilizing the proportions of each as specified hereinafter.

The composition may optionally contain an unsaturated polyester or a poly(acrylate).

The unsaturated polyester may be prepared from the same diols and diacids or anhydrides, or mixtures thereof, as are used to prepare the predominantly hydroxyl-terminated polyester, supra.

The unsaturated polyesters are generally prepared by heating approximately equimolar amounts of the diol with the dicarboxylic acid or anhydride at a temperature of about 200° C. for periods of about 4 to 24 hours. The polyesters have number average molecular weights (Mn) in the range of from about 500 to about 5000, and they contain unsaturation distributed along the chain. The unsaturation is normally in the form of fumarate diesters. These polyesters have acid numbers in the range of from about 2 to about 50, preferably from about 8 to about 45. (The acid number is the milligrams of potassium hydroxide needed to neutralize one gram of sample). Many of the polyesters have hydroxyl numbers approximately equal to or greater than their acid numbers. The unsaturated polyesters, as described herein, are present in commercially available polyester resins.

The poly(acrylates) which may be used herein as characterized by the following empirical formula:

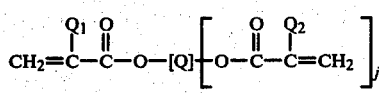

wherein Q is the residue of an organic polyhydric alcohol which contained alcoholic hydroxyl groups bonded to different carbon atoms, $Q_1$ and $Q_2$ are independently hydrogen or methyl, and j is an integer of from 1 to 3.

The polyhydric alcohol suitable for preparing the poly(acrylate) typically contains at least two carbon atoms and may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol; diethylene glycol; 2,2,4-trimethyl-1,3-pentanediol; dipropylene glycol; 1,2-propylene glycol; polypropylene glycol having an average molecular weight of from about 150 to about 600, triethylene glycol; 1-4-cyclohexane dimethanol; neopentyl glycol; 2,2-dimethyl-3-hydroxypropyl 2,2-dimethyl-3-hydroxypropionate; polyethylene glycol having an average molecular weight of about from 150 to about 600; the ethylene and propylene oxide adducts of 2,2-bis[4-(hydroxyphenyl)]propane; triethanolamine; 1,3-butanediol; tetraethylene glycol; 2,2-bis(4-hydroxyphenyl)propane; glycerine; trimethylol propane; 1,4-butanediol, the polycaprolactone ester of trimethylol propane in which about 1.5 moles of caprolactone are reacted with each mole of trimethylol propane; the polycaprolactone ester of trimethylol propane in which about 3.6 moles of caprolactone are reacted with each mole of trimethylol propane; 2-ethyl-1,3-hexanediol, 1,5-pentanediol, tripropylene glycol, 2,2-bis(4-hydroxycyclohexyl)propane; 1,2,6-hexane triol; 1,3-propanediol; 1,6-hexanediol and the like. Mixtures of the aforementioned polyols may be used in this invention.

The poly(acrylate) of the aforementioned organic polyhydric alcohol can be prepared by the reaction of acrylic acid or methacrylic acid, or their simple esters, with the polyhydric alcohol under conditions well known in the art.

The initiators which are suitable for use in this invention include peroxyketals, ketone peroxides and alkyl hydroperoxides.

The peroxyketals have the following general formula:

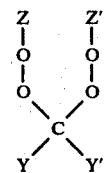

wherein Z and Z' are independently a tertiary alkyl group of from 4 to 12 carbon atoms, Y and Y' are independently alkyl groups, and Y and Y' together with the carbon atom may also form cycloalkyls. The Y groups may also independently contain halogen, ester, nitrile or keto groups.

Peroxyketals are prepared by reacting alkyl hydroperoxides (ZOOH) with ketones

(YCY').

Examples of such compounds include 1,1-bis(t-butylperoxy)-3,3,5-trimethyl cyclohexane, 1,1-bis(t-butylperoxy)-cyclohexane, 2,2-bis(t-butylperoxy)butane, ethyl-3,3-bis(b-butylperoxy)butyrate, 1,1-bis(t-amylperoxy)-cyclohexane, and 2,2 bis(t-octylperoxy)propane. Other suitable peroxyketals are described in, for example, U.S. Pat. Nos. 2,455,569; 3,763,275, 3,928,466 and 3,950,432.

The ketone peroxides which may be used herein are prepared by reacting hydrogen peroxide with ketones. Typical ketones include methyl ethyl ketone, cyclohexanone, 2,4-pentanedione, and the like. In formulations prepared from methyl ethyl ketone, structures such as the following are formed:

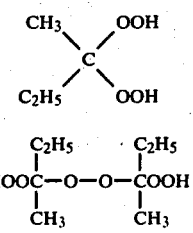

Solutitons of methyl ethyl ketone peroxide are commercially available as, for example, Lupersol DDM (available from the Lucidol Division of Pennwalt Corp.) and Witco HiPoint 180 (available from Witco Division of U.S. Peroxygen Corp.). Generally, these peroxides are recommended for room temperature cure of polyester resins in the presence of promoters, such as cobalt naphthenate. With the compositions of this invention, the addition of such promoters is unnecessary for obtaining fast cure rates.

The alkyl hydroperoxides suitable for use in this invention include t-butyl hydroperoxide, t-amyl hydroperoxide, cumene hydroperoxide, and the like.

In order to avoid premature crosslinking reactions in the composition, it is desirable to add polymerization inhibitors. These include tertiary-butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 600 parts per million by weight.

When a fixed level of free radical polymerization inhibitor is present in the instant composition, the pot life (i.e., the time in which the composition becomes a non-flowable mixture due to the onset of crosslinking) depends on several factors, including the type of initiator and acidity of the resin. The pot lives of the compositions range from less than 1 hour at 25° C. to about 7 days. Shorter pot lives are favored with 1,1-bis(t-butylperoxy)-3,3,5-trimethyl cyclohexane, and methyl ethyl ketone peroxides, as compared to ethyl 3,3-bis(t-butylperoxy)butyrate or t-butyl hydroperoxide. A high acid number in the resin also favors a short pot life.

For compositions containing 1,1-bis(t-butylperoxy)-3,3,5-trimethyl cyclohexane, it is desirable to mix the initiator with the resin immediately prior to injection. An impingement mixing head found in commercial polyurethane reaction injection molding machines may be used to effect such mixing.

The unsaturated ester of formula (I) is present in an amount of from about 10 to about 80, preferably from about 20 to about 70 percent by weight of the total composition. The ratio of maleic anhydride to the ester of formula (I) is from about 1:200 to 1:4, preferably from about 1:50 to 1:6, based on the moles of maleic anhydride to moles of ester groups (i.e.,

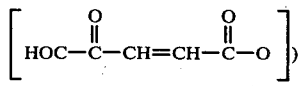

in the ester of formula (I). The ethylenically unsaturated monomer is present in amounts of from about 10 to about 90, preferably from about 15 to about 80 percent by weight of the total composition.

The initiator is present in amounts of from about 0.05 to about 5, preferably from about 0.20 to about 3.0 percent by weight of the total composition. If used, the polyester or poly(acrylate) is present in amounts of from about 1 to about 70, preferably from about 5 to about 60 percent by weight of the total composition.

The composition of this invention is characterized by an acid number greater than about 40, preferably greater than about 45. The acid number is defined as the milligrams of potassium hydroxide needed to neutralize one gram of resin. This procedure is carried out in a methanol/pyridine mixed solvent (1:1 by volume) so that maleic anhydride titrates as a monoacid.

The compositions of this invention are low viscosity liquids. When they contain 30 percent by weight of styrene as the ethylenically unsaturated monomer, the solution viscosities at 23° C. range from about 30 to about 4000 centipoises. At higher styrene contents, the viscosities are lower.

The compositions of this invention can be cured neat or in combination with fillers, pigments, fibers with a melting point or a glass transition temperature above about 130° C., such as fiberglass, carbon fibers, graphite fibers, and aromatic polyamide fibers (such as aramid fibers sold by E. I. duPont Nemours, Wilmington, Delaware under the trademark Kevlar) etc., hollow glass or phenolic resin spheres, and the like.

The compositions of this invention are particularly useful for the manufacture of rigid fiber reinforced molded articles. A preferred procedure for producing a molded article from this composition is described in U.S. patent application Ser. No. 135,906, supra. In this application, a process for rapidly fabricating fiber reinforced thermoset resin articles is described. The fiber reinforcement is comprised of one or more fibers with a melting point or a glass transition temperature above about 130° C. The process comprises the steps of (a) providing one or more of such fibers in the form of an interlocked mass in a heatable matched metal die mold, (b) providing in an accumulator zone a liquid body of a thermosettable organic material having a viscosity determined at 120° C., in the absence of curing agent therefor, of less than about 50 centipoises, and which is curable upon heating to a thermoset resin composition, the viscosity of said liquid body being maintained essentially constant in the accumulator by keeping its temperature below that at which curing of said materials is substantial, (c) closing the mold containing the web, (d) injecting at least a portion of said thermosettable organic material under pressure from said accumulator zone into said mold to thereby fill the cavity in said mold, (e) initiating the curing of said materials by heating the mold above the temperature at which the curing of said materials is initiated, and (f) opening said mold and removing the cured thermoset article therefrom. The fiber reinforcement may be from about 15 to about 80 weight percent of the weight of the molded article which is removed from the mold.

For compositions of the present invention having a pot life of a few hours or more, the apparatus described in U.S. application Ser. No. 135,906 containing one or two accumulator zones is entirely adequate for making fiber reinforced composite articles. However, if the instant compositions possess short pot lives, it is desirable to effect rapid mixing of the two reactive streams just prior to their entry into the mold. This can be accomplished by inserting, for example, an impingement mixing head or a static mixer into the nozzle and using two accumulator zones. In this configuration, the ester of formula (I) and maleic anhydride can be kept separate from the initiator until parts are fabricated. The ethylenically unsaturated monomer and optional ingredients may be stored in either or both accumulator zones.

The compositions of this invention can also be used to impregnate fabrics, manufacture laid up laminate structures for use in electrical potting and casting processes to protect motors, windings, and the like. In addition, they may be used as adhesives, as for example for binding metals and plastics.

The compositions of this invention may be used in a variety of fabrication processes besides that in U.S. patent application Ser. No. 135,906, including spray up, pultrusion, and resin transfer molding.

EXAMPLES

The following examples serve to illustrate specific embodiments of this invention and it is not intended that the invention shall be limited by the examples.

The resins used in the Examples are prepared as follows:

RESIN 1

A 10 gallon stainless steel reactor equipped with an agitator and an insert gas inlet and outlet was charged with 21.94 kilograms (kg) of maleic anhydride. When the liquid anhydride was at 63° C., 9.98 kg of molten 2,2,4-trimethyl-1,3-pentanediol and 3.32 kg of propylene glycol were added, causing the temperature of the mixture to drop to 48° C. The mixture was then warmed to 55° C. and treated with 17 g of N-methylimidazole. The mixture was then heated to about 80° C. during the next 50 minutes. It was then cooled to 61° C. and treated with an additional 53 g of N-methylimidazole. After being reheated to 80° C. and maintained at that temperature for about 3 hours, the mixture was discharged. The product was a viscous amber syrup which contained less than 15 percent of the original charge of maleic anhydride in unreacted form.

A 1000 g portion of the product was blended with 1000 g of styrene containing 0.50 g of methyl hydroquinone. The resulting amber solution had an acid number of 174 when measured in a pyridine/methanol mixed solvent and was designated Resin 1.

RESIN 2

A 10 gallon stainless steel reactor equipped with an agitator and an inert gas inlet and outlet was changed with 22.77 kg of maleic anhydride. When the liquid anhydride was at 63° C., 14.97 kg of molten 2,2,4-trimethyl-1,3-pentanediol and 4.56 kg of the polycaprolactone ester of trimethylol propane in which about 3.6 moles of caprolactone were reacted with each mole of trimethylol propane were added, causing the temperature of the mixture to drop to about 45° C. The mixture was then warmed to about 55° C. and 78 g of N-methylimidazole in 0.45 kg of the polycaprolactone ester was added with mixing. The mixture was warmed to about 80° C. during the next 50 minutes. The reaction mixture was maintained at that temperature for about 4 hours and then discharged. The product was a viscous amber syrup which contains less than 15 percent of the original charge of maleic anhydride in unreacted form.

A 1000 g portion of the product was blended with 1000 g of styrene containing 0.50 g of methyl hydroquinone. The resulting amber solution had an acid number of 155, and was designated Resin 2.

RESIN 3

A 5 liter flask equipped with a paddle stirrer, a thermometer, a 12-inch packed distillation column, an electric heating mantle, and an inlet and outlet for inert gas was charged with 588 g of molten maleic anhydride and 342 g of propylene glycol. After the mixture was warmed to about 120° C., 1896 g of the 2-mole ethoxylate of bisphenol A was added. The mixture was heated to about 210° C. over the next 3 hours and maintained at that temperature for 2.5 hours as by-product water was distilled overhead. The mixture was then cooled to about 135° C. and held at this temperature for about 16 hours. At the end of this period, the temperature was raised to about 150° C., and a vacuum of 60 mm of mercury was applied. After about 3 hours, a sample was removed for analysis. The product, a hydroxyl-terminated polyester, had an acid number of 4.7 and a hydroxyl number of 163.

A 2600 g portion of the hydroxyl-terminated polyester was treated with 630 g of maleic anhydride. The mixture was maintained at from about 100° to about 120° C. for about 4 hours before being blended with a solution of methyl hydroquinone in styrene.

A solution containing 50 weight percent of the maleic anhydride/hydroxyl-terminated polyester reaction product and 50 weight percent of styrene was prepared. To the solution was added an inhibitor comprising 250 ppm of methyl hydroquinone. The composition had an acid number of 56 and was designated as Resin 3.

RESIN 4

This resin was prepared by blending 50 g of Resin 1 with 50 g of a commercial polyester resin. The commercial polyester resin (type MR 14017 sold by U.S. Steel Corp.) contained 70 weight percent of an unsaturated polyester derived from isophthalic acid, maleic anhydride, diethylene glycol, and propylene glycol dissolved in styrene. The polyester had an acid number of 25 and an average molecular weight of about 2400. The acid number of the commercial polyester resin was outside of the range specified in the instant invention.

The overall styrene content of this resin was 40 percent by weight. The resin had an acid number of 112 and was designated Resin 4

METHODS FOR MEASURING CURE SPEEDS OF THE FORMULATIONS

The cure rates of the resin formulations were determined by two methods. The first was the standard SPI Gel Time Test which was carried out at 180° F. (82.3° C.). This procedure is described by A. L. Smith, 6th SPI, Chicago, Ill., 1951, Reinforced Plastics Div., Section 1, page 1. For a given resin, the cure speed of a formulation is reflected by the gel time and by the total time to peak temperature. It was found that the gel times and total times observed with the initiators of this invention were shorter than the gel times and cure times observed with initiators outside the scope of this invention which had similar 10 hour half life temperatures.

The second method for measuring cure rates was to monitor the temperature rise in fiber reinforced composites molded by the process described in U.S. patent application Ser. No. 135,906, supra, using in-mold thermocouples. The time required to reach the peak temperature was used to compare resin/initiator mixtures. Cure was essentially complete when the peak temperature was reached. A short time to peak temperature was desirable since a shorter molding cycle could be used, leading to higher productivity.

In the Examples and Controls which follow, a series of initiators were used. Those which are representative of the initiators of this invention are listed in Table III and are designated A through F. Based on their 10 hour half life temperatures in non-polar solvents, these initiators effected unexpectedly fast cures using the resins of this invention. The chemical classes to which the initiators belong are also listed. Table IV lists the initiators used in the Controls.

TABLE III
INITIATORS USED IN THE EXAMPLES

| Initiator | Designation | 10 hour half life temperature in non polar solvent (°C.) | Chemical Class |
|---|---|---|---|
| 1,1-bis(t-butylperoxy)-3,3,5-trimethyl cyclohexane | A | 92 | peroxyketal |
| 1,1-bis(t-butylperoxy) cyclohexane | B | 93 | peroxyketal |
| 2,2-bis(t-butylperoxy) butane | C | 100 | peroxyketal |
| methyl ethyl ketone peroxide[a] | D | 105 | ketone peroxide |
| ethyl 3,3-bis (t-butylperoxy) butyrate | E | 114 | peroxyketal |
| t-butyl hydroperoxide | F | 172 | alkyl hydroperoxide |

[a]Lupersol DDM, 60 percent by weight of methyl ethyl ketone peroxide in a phthalate plasticizer.

TABLE IV
INITIATORS USED IN THE CONTROLS

| Initiator | Designation | 10 hour half life temperature in non polar solvent (°C.) | Chemical Class |
|---|---|---|---|
| 2-t-butylazo-2-cyano-4-methylpentane | G | 70 | azo compound |
| t-butyl peroctoate | H | 73 | alkyl perester |
| benzoyl peroxide | I | 73 | diacyl peroxide |
| 2-t-butylazo-2-cyano-butane | J | 82 | azo compound |
| t-butyl 2-methyl-perbenzoate | K | 97 | aryl perester |
| t-butyl 2-methyl-perbenzoate | L | 105 | aryl perester |
| dicumyl peroxide | M | 115 | dialkyl peroxide |

The following Examples 1 through 9 and Controls A through F describe gel time experiments. In the Examples, the initiators effect unusually short gel and cure times, based on their 10 hour half life temperatures.

GENERAL PROCEDURE FOR GEL TIME TESTS

A 20 g portion of resin was combined with 0.20 g of the initiator in a small jar. The mixture was stirred for 5 minutes and then poured into a 19×150 millimeter test tube to a depth of 3 inches. A thermocouple was placed into the center of the mixture, and the tube immersed in a bath at 180° F. The gel time was the time required for the temperature in the sample to rise from 150° F. (65.5° C.) to 190° F. (87.8° C.). The total time was the time for the temperature to rise from 150° F. to maximum temperature.

Many initiators are commercially available only as mixtures in inert carriers such as butyl benzyl phthalate or odorless mineral spirits. The amount of commercial mixture affording 0.20 g of initiator was used in the gel time tests.

The formulations in the gel time test consisted of a particular resin and a particular initiator. Formulations were designated to reflect the components.

Table V shows the gel time test results obtained with Resin 1. The formulations in Examples 1 through 4 cured more rapidly than any of the Controls. The formulations in Examples 5 and 6 cured more rapidly than Controls D and E. The 10 hour half life temperature of the initiator in Control D was significantly lower than those for the initiators in Examples 5 and 6.

Table VI shows gel time test results for Resins 2, 3 and 4. For each resin, shorter gel times and cure times were obtained using an initiator of this invention, as compared to using 2-t-butylazo-2-cyanobutane, an azo initiator which had a significantly lower 10 hour half life temperature.

TABLE V
SPI GEL TIME RESULTS WITH RESIN 1[a]

| | Initiator | 10 Hour Half Life Temperature of Initiator in Non-Polar Solvent (°C.) | Gel Time (min) | Total Time (min) | Peak Temperature (°C.) |
|---|---|---|---|---|---|
| Examples | | | | | |
| 1 | A | 92 | 0.4 | 1.5 | 259 |
| 2 | B | 93 | 1.1 | 2.3 | 247 |
| 3 | C | 100 | 0.5 | 1.8 | 241 |
| 4 | D | 105 | 0.6 | 2.2 | 249 |
| 5 | E | 114 | 10.0 | 15.5 | 233 |
| 6 | F | 172 | 12.9 | 25.9 | 194 |
| Controls | | | | | |
| A | G | 70 | 3.5 | 5.4 | 246 |
| B | H | 73 | 4.6 | 7.0 | 251 |
| C | J | 82 | 7.4 | 10.5 | 237 |
| D | L | 105 | 29.1 | 44.8 | 193 |
| E | M | 115 | 60[b] | — | — |

[a]In these experiments about 5 mole percent of the original charge of maleic anhydride was unreacted.
[b]Test terminated after 1 hour.

TABLE VI
SPI GEL TIME RESULTS WITH RESINS 2, 3 AND 4

| | Formulation | | 10 Hour Half Life Temperature of Initiator in Non-Polar Solvent (°C.) | Gel Time Test Results | | |
|---|---|---|---|---|---|---|
| Example | Resin | Initiator | | Gel Time (min.) | Total Time (min.) | Peak Temperature (°C.) |
| 7 | 2 | A | 92 | 0.5 | 1.7 | 257 |
| Control F | 2 | I | 73 | 12.7 | 16.9 | 237 |
| Control G | 2 | J | 82 | 13.2 | 18.5 | 209 |
| 8 | 3 | A | 92 | 0.7 | 1.7 | 257 |
| Control H | 3 | J | 82 | 8.7 | 11.2 | 238 |
| 9 | 4 | A | 92 | 0.2 | 0.9 | 246 |
| Control I | 4 | J | 82 | 6.0 | 8.4 | 234 |

Examples 10 through 17 and Controls J through P describe the preparation of fiber reinforced composites. The composites were prepared by injecting the resin formulations into a web of glass fibers in a heated mold. The resins contained between 0.9 and 1.5 phr of initiators and 0.5 phr of Zelec UN (an organophosphate mold release sold by E. I. duPont de Nemours, Wilmington, Del.). The glass mat was type AKM chopped strand mat (1½ oz./sq.ft., sold by PPG Industries, Pittsburgh, Pa.). The cure speed of the formulation was monitored by a small thermocouple embedded in the web of glass fibers.

All composites were nominally 6×6×3/16 inches. In all Examples and Controls, except for Example 16, a mold temperature of 140° C. was used.

EXAMPLE 10

Ten plies of glass mat with dimensions 5⅞×5⅞ inches and weighing 93 g was placed in a heated press having a cavity of 6×6×3/16 inches. After a thermocouple was placed between the fifth and sixth plies, the mold was closed. As the temperature in the cavity was increasing, 2.0 g of Trigonox 29-B75 (a 75 percent solution of 1,1-bis(t-butylperoxy)-3,3,5-trimethylcyclohexane in dibutyl phthalate) was added to a solution of 150 g of Resin 1 containing 0.75 g of Zelec UN mold release. When the temperature in the cavity reached 130° C., the resin mixture was injected into the web of fibers over a 5 second period. A hydrostatic pressure of 250 psi was maintained on the resin for 85 seconds, and then the pressure was released. The part was maintained in the mold for an additional 30 seconds (total cure time was 2 minutes). Then the press was opened, and a hot rigid part was removed. The part weighed 165 g.

During the molding of this part, the internal temperature in the part reaches a maximum of 208° C. after 57 seconds.

EXAMPLES 11 TO 13

Composites wre molded by the procedure as described in Example 10, except that in Example 13 the hydrostatic pressure was maintained on the part for 105 seconds.

CONTROLS J TO M

Composites in Controls J through M were molded by the procedure as described in Example 10, except that the hydrostatic pressure was maintained on the part for 120 seconds, and the total time in the mold was 3 minutes.

The times to peak temperature in the composites of Example 10 and 11 were shorter than any of the times to peak temperature for the composites in Controls J through M. The times to peak temperature in Examples 12 and 13 were shorter than those in Controls L and M which contained an initiator with a lower 10 hour half life temperature.

The mechanical properties of the composites prepared in Examples 10, 11 and 12 were measured. The flexural strength and flexural modulus were determined according to ASTM D-790. The glass content was determined by ashing. The results are shown in Table VII. The data show that composites with high mechanical properties can be obtained on short molding cycles using the compositions of this invention.

TABLE VIII

| Example | Resin | Initiator Type | Amount (phr) | 10 Hr. Half Life Temperature in Non Polar Solvent (°C.) | Time to Peak Temperature (sec) | Peak Temperature (°C.) | Total Mold Closed Time (Min) | Flexural Strength ($10^3$ psi) | Flexural Modulus ($10^6$ psi) | Glass Content wt. % |
|---|---|---|---|---|---|---|---|---|---|---|
| 14 | 2 | A | 1.0 | 92 | 77 | 201 | 2.0 | 40.1 | 1.75 | 54 |
| 15 | 2 | A | 1.5 | 92 | 54 | 229 | 2.0 | 34.2 | 1.64 | 52 |
| 16 | 2 | D | 0.9 | 105 | 110[a] | 149[a] | 3.0 | 35.8 | 1.89 | 56 |
| Control N | 2 | J | 1.0 | 82 | 90 | 237 | | | | |
| Control O | 2 | L | 1.0 | 105 | 117 | 242 | | | | |
| 17 | 3 | A | 1.12 | 92 | 39 | 230 | 2.0 | 31.3 | 1.50 | 50 |
| Control P | 3 | J | 1.12 | 82 | 54 | 249 | | | | |

[a] Mold Temperature was 120° C.

EXAMPLES 14 AND 15

Composites were molded using Resin 2 by the procedure as described in Example 10. The cure speed data, flexural properties, and glass contents of the composites are shown in Table VIII.

EXAMPLES 16

A composite was molded using Resin 2 by the procedure as described in Example 10, except that the mold temperature was 120° C., the hydrostatic pressure was maintained on the resin for 120 seconds, and the total mold closed time was 3 minutes. The flexural properties of this composite are shown in Table VIII.

CONTROLS N AND O

In Controls N and O composites were molded at 140° C. using the same procedure as described for Controls J through M. The time to peak temperature in Example 15 was shorter than the time to peak temperature for Control N. Similarly, a shorter time was recorded in Example 16 than in Control O, which was molded at a 20° C. higher temperature.

EXAMPLE 17

A composite was molded from Resin 3 and initiator A using the procedure as described in Example 10. The cure speed data, flexural properties, and glass contents are shown in Table VIII.

CONTROL P

A composite was molded from Resin 3 and Initiator J using the procedure as described in Controls J through M. The cure speed data is shown in Table VIII. Compared to Example 17, the formulation of Control P took longer to cure, even though the 10 hour half life temperature of the initiator in the Control was substantially lower.

The data in Table VIII show that fiber reinforced articles with a high level of strength and stiffness can be fabricated on short molding cycles using the compositions of this invention.

TABLE VII

| Example | Resin | Initiator Type | Amount (phr) | 10 Hr. Half Life Temperature in Non Polar Solvent (°C.) | Time to Peak Temperature (sec) | Peak Temperature (°C.) | Total Mold Closed Time (Min) | Flexural Strength ($10^3$ psi) | Flexural Modulus ($10^6$ psi) | Glass Content wt. % |
|---|---|---|---|---|---|---|---|---|---|---|
| 10 | 1 | A | 1.0 | 92 | 57 | 208 | 2.0 | 35.2 | 1.67 | 53 |
| 11 | 1 | B | 1.2 | 93 | 50 | 224 | 2.0 | 38.2 | 1.82 | 52 |
| 12 | 1 | E | 1.12 | 114 | 96 | 239 | 2.0 | 35.1 | 1.79 | 54 |
| 13 | 1 | F | 1.3 | 172 | 108 | 239 | 2.0 | — | — | — |
| Control J | 1 | H | 1.0 | 73 | 73 | 190 | | | | |
| Control K | 1 | K | 1.0 | 97 | 93 | 247 | | | | |
| Control L | 1 | L | 1.0 | 105 | 131 | 230 | | | | |
| Control M | 1 | L | 1.5 | 105 | 112 | 242 | | | | |

What is claimed is:

1. A curable liquid composition comprising:
(a) an unsaturated ester characterized by the following empirical formula:

$$[HOC-CH=CHC-O]_n-R-(OH)_m \quad (I)$$

wherein n is a number having an average value of about 1.5 to less than about 4, m is equal to the free valence of R less the average value of n, R is the hydroxyl-free residue of an organic polyol or polyester which contained from 2 to 4, inclusive, hydroxyl groups, OH, in formula (I), (b) maleic anhydride, (c) an ethylenically unsaturated monomer copolymerizable with (a) and (b), and (d) an initiator selected from the group consisting of peroxyketal, ketone peroxide and alkyl hydroperoxide, wherein the composition has an acid number greater than about 40.

2. A composition as defined in claim 1 wherein the polyol is derived from an organic polyol selected from the group consisting of ethylene glycol, diethylene glycol, 2,2,4-trimethyl-1,3-pentanediol, dipropylene glycol, 1,2-propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, 1,3-butanediol, tetraethylene glycol, 2,2-bis(4-hydroxyphenyl) propane, the ethylene and propylene oxide adducts of 2,2-bis(4-hydroxyphenyl)propane, pentaerythritol, erythritol, glycerine, trimethylol propane, 1,4-butanediol, 1,6-hexanediol, the polycaprolactone ester of trimethylol propane in which about 1.5 moles of caprolactone are reacted with each mole of trimethylol propane, the polycaprolactone ester of trimethylol propane in which about 3.6 moles of caprolactone are reacted with each mole of trimethylol propane, 2-ethyl-1,3-hexanediol, 1,5-pentanediol, tripropylene glycol, 2,2-bis(4-hydroxycyclohexyl)propane, 1,2,6-hexanetriol, 1,3-propanediol, and mixtures thereof.

3. A composition as defined in claim 1 wherein the polyester is derived from a predominantly hydroxyl-terminated polyester having a molecular weight not exceeding 1500 and obtained by the condensation of a diol with a dicarboxylic acid or anhydride, or mixtures of diols and diacids.

4. A composition as defined in claim 3 wherein the diol is selected from the group consisting of 1,2-propylene glycol, ethylene glycol, 1,3-butanediol, 2,2-dimethyl-1,3-propanediol, dipropylene glycol, diethylene glycol, 2,2-dimethyl-3-hydroxpropyl 2,2-dimethyl-3-hydroxypropionate, the ethylene and propylene oxide adducts of 2,2-bis(4-hydroxyphenyl)propane, 1,4-cyclohexane dimethanol, and mixtures thereof.

5. A composition as defined in claim 3 wherein the dicarboxylic acid or anhydride is selected from the group consisting of maleic acid and anhydride, fumaric acid, ortho-phthalic acid and anhydride, isophthalic acid, terephthalic acid, carbic acid and anhydride, and mixtures thereof.

6. A composition as defined in claim 1 wherein the ethylenically unsaturated monomer comprises styrene.

7. A composition as defined in claim 1 wherein the peroxyketal has the following general formula.

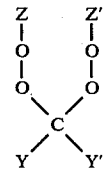

wherein Z and Z' are independently a tertiary alkyl group of from 4 to 12 carbon atoms and Y and Y' are independently selected from alkyl, and Y and Y' together with the carbon atom may form cycloalkyls and wherein Y and Y' groups may also independently contain halogen, ester, nitrile or keto groups.

8. A composition as defined in claim 7 wherein the peroxyketal is selected from the group consisting of 1,1-bis(t-butylperoxy)-3,3,5-trimethylcyclohexane, 1,1-bis(t-butylperoxy)cyclohexane, 2,2-bis(t-butylperoxy)butane, ethyl 3,3-bis(t-butylperoxy)butyrate, and 1,1-bis(t-amylperoxy)cyclohexane, 2,2-bis(t-octylperoxy)propane, and mixtures thereof.

9. A composition as defined in claim 1 wherein the ketone peroxide is selected from the group consisting of methyl ketone, cyclohexanone, and 2,4-pentanedione.

10. A composition as defined in claim 1 wherein the alkyl hydroperoxide is selected from the group consisting of t-butyl hydroperoxide, t-amyl hydroperoxide, and cumene hydroperoxide.

11. A composition as defined in claim 1 which additionally contains an unsaturated polyester, said unsaturated polyester being different from (a).

12. A composition as defined in claim 11 wherein the polyester is obtained by the condensation of a diol with an unsaturated dicarboxylic acid or anhydride, or mixtures of diols and diacids.

13. A composition as defined in claim 12 wheren the polyester has a number average molecular weight in the range of from about 500 to about 5000.

14. A composition as defined in claim 1 wherein the unsaturated ester of formula (I) is present in an amount of from about 10 to about 80 percent by weight of the total composition.

15. A composition as defined in claim 1 wherein the ratio of maleic anhydride to the unsaturated ester of formula (I) is from about 1:200 to 1:4.

16. A composition as defined in claim 1 wherein the ethylenically unsaturated monomer is present in amounts of from about 10 to about 90 percent by weight of the total composition.

17. A composition as defined in claim 1 wherein the initiator is present in amounts of from about 0.05 to about 5 percent by weight of the total composition.

18. A molded article produced from the composition of claims 1 or 11.

19. A composition as defined in claim 1 which additionally contains a poly(acrylate) of the following formula:

$$CH_2=C-C-O-[Q]\left[O-C-C=CH_2\right]_j$$
with $Q_1$, O, O, $Q_2$ on the respective carbons wherein Q is the residue of an organic polyhydric alcohol which contained alcoholic hydroxyl groups bonded to different carbon atoms, $Q_1$ and $Q_2$ are independently hydrogen or methyl, and j is 1 to 3, said polyacrylate being different from (C).

* * * * *